(12) United States Patent
Saidi et al.

(10) Patent No.: US 7,321,881 B2
(45) Date of Patent: Jan. 22, 2008

(54) METHODS AND SYSTEMS FOR PREDICTING OCCURRENCE OF AN EVENT

(75) Inventors: Olivier Saidi, Greenwich, CT (US); David A. Verbel, New York, NY (US); Lian Yan, Chester Springs, PA (US)

(73) Assignee: Aureon Laboratories, Inc., Yonkers, NY (US)

( * ) Notice: Subject to any disclaimer, the term of this patent is extended or adjusted under 35 U.S.C. 154(b) by 301 days.

(21) Appl. No.: 11/067,066

(22) Filed: Feb. 25, 2005

(65) Prior Publication Data

US 2005/0197982 A1    Sep. 8, 2005

Related U.S. Application Data

(60) Provisional application No. 60/577,051, filed on Jun. 4, 2004, provisional application No. 60/548,322, filed on Feb. 27, 2004.

(51) Int. Cl.
*G06E 1/00* (2006.01)
*G06E 3/00* (2006.01)
*G06F 15/18* (2006.01)
*G06G 7/00* (2006.01)
*G01N 33/574* (2006.01)

(52) U.S. Cl. ............... 706/21; 706/15; 435/7.23

(58) Field of Classification Search ............ 706/21
See application file for complete search history.

(56) References Cited

U.S. PATENT DOCUMENTS 4,097,845 A  6/1978  Bacus
4,999,290 A * 3/1991 Lee ........................... 435/6
5,016,283 A  5/1991  Bacus et al.

(Continued)

FOREIGN PATENT DOCUMENTS

WO    WO 96/09594    3/1996

OTHER PUBLICATIONS

Improved prediction of prostate cancer recurrence based on an automated tissue image analysis system Teverovskiy, M.; Kumar, V.; Junshui Ma; Kotsianti, A.; Verbel, D.; Tabesh, A.; Ho-Yuen Pang; Vengrenyuk, Y.; Fogarasi, S.; Saidi, O.; Biomedical Imaging: Macro to Nano, 2004. IEEE International Symposium on Apr. 15-18, 2004 pp. 257-260 vol. 1.*

(Continued)

*Primary Examiner*—Michael B. Holmes
(74) *Attorney, Agent, or Firm*—Mintz, Levin, Cohn, Ferris, Glovsky and Popeo, P.C.

(57) ABSTRACT

Embodiments of the present invention are directed to methods and systems for training a neural network having weighted connections for classification of data, as well as embodiments corresponding to the use of such a neural network for the classification of data, including, for example, prediction of an event (e.g., disease). The method may include inputting input training data into the neural network, processing, by the neural network, the input training data to produce an output, determining an error between the output and a desired output corresponding to the input training data, rating the performance neural network using an objective function, wherein the objective function comprises a function C substantially in accordance with an approximation of the concordance index and adapting the weighted connections of the neural network based upon results of the objective function.

14 Claims, 7 Drawing Sheets

U.S. PATENT DOCUMENTS

| | | | | |
|---|---|---|---|---|
| 5,081,032 | A | * | 1/1992 | Yoshida et al. ........ 530/388.85 |
| 5,188,964 | A | * | 2/1993 | McGuire et al. .............. 436/64 |
| 5,344,760 | A | * | 9/1994 | Harvey et al. ............... 435/7.5 |
| 5,447,843 | A | * | 9/1995 | McGuire et al. ................ 435/6 |
| 5,526,258 | A | | 6/1996 | Bacus |
| 5,532,135 | A | * | 7/1996 | Ceriani et al. ............. 435/7.92 |
| 5,665,874 | A | * | 9/1997 | Kuhajda et al. ............ 536/24.3 |
| 5,674,753 | A | * | 10/1997 | Harvey et al. .............. 436/501 |
| 5,698,409 | A | * | 12/1997 | O'Neill ..................... 435/7.23 |
| 5,701,369 | A | | 12/1997 | Moon et al. |
| 5,759,791 | A | * | 6/1998 | Kuhajda et al. ........... 435/7.23 |
| 5,759,837 | A | * | 6/1998 | Kuhajda et al. ............ 435/193 |
| 5,769,074 | A | | 6/1998 | Barnhill et al. |
| 5,856,112 | A | * | 1/1999 | Marley et al. ............. 435/7.23 |
| 5,862,304 | A | * | 1/1999 | Ravdin et al. ................ 706/21 |
| 5,872,217 | A | * | 2/1999 | Kuhajda et al. ......... 530/387.7 |
| 5,891,619 | A | * | 4/1999 | Zakim et al. ................... 435/4 |
| 5,989,811 | A | * | 11/1999 | Veltri et al. ..................... 435/6 |
| 6,025,128 | A | * | 2/2000 | Veltri et al. ..................... 435/6 |
| 6,059,724 | A | | 5/2000 | Campell et al. |
| 6,063,026 | A | | 5/2000 | Schauss et al. |
| 6,137,899 | A | | 10/2000 | Lee et al. |
| 6,190,885 | B1 | * | 2/2001 | Ceriani et al. ............. 435/69.7 |
| 6,317,731 | B1 | | 11/2001 | Luciano |
| 6,358,682 | B1 | * | 3/2002 | Jaffee et al. .................... 435/6 |
| 6,409,664 | B1 | | 6/2002 | Kattan et al. |
| 6,427,141 | B1 | | 7/2002 | Barnhill |
| 6,472,415 | B1 | | 10/2002 | Sovak et al. |
| 6,531,277 | B2 | * | 3/2003 | Timms ........................... 435/6 |
| 6,534,266 | B1 | | 3/2003 | Singer |
| 6,611,833 | B1 | | 8/2003 | Johnson |
| 6,656,684 | B1 | * | 12/2003 | Sandler ........................ 435/6 |
| 6,658,395 | B1 | | 12/2003 | Barnhill |
| 6,746,848 | B2 | * | 6/2004 | Smith ........................ 435/7.23 |
| 6,789,069 | B1 | | 9/2004 | Barnhill et al. |
| 6,815,170 | B1 | * | 11/2004 | Morton ...................... 435/7.23 |
| 6,821,767 | B1 | | 11/2004 | French et al. |
| 6,944,602 | B2 | | 9/2005 | Cristianini |
| 7,067,111 | B1 | * | 6/2006 | Yang et al. ................... 424/9.1 |
| 7,101,663 | B2 | * | 9/2006 | Godfrey et al. ................ 435/6 |
| 7,122,322 | B2 | * | 10/2006 | Timms ........................ 435/7.1 |
| 7,132,276 | B1 | * | 11/2006 | Ikawa et al. ............. 435/320.1 |
| 7,223,380 | B2 | * | 5/2007 | Yang et al. ................... 424/9.4 |
| 7,229,604 | B2 | * | 6/2007 | Yang et al. ................... 424/9.1 |
| 7,238,492 | B2 | * | 7/2007 | Sandler ...................... 435/7.23 |
| 2001/0036632 | A1 | | 11/2001 | McGrath et al. |
| 2002/0086347 | A1 | | 7/2002 | Johnson et al. |
| 2002/0165837 | A1 | | 11/2002 | Zhang et al. |
| 2002/0196964 | A1 | | 12/2002 | Stone et al. |
| 2003/0048931 | A1 | | 3/2003 | Johnson et al. |
| 2003/0172043 | A1 | | 9/2003 | Guyon et al. |
| 2003/0235816 | A1 | * | 12/2003 | Slawin et al. ................... 435/5 |
| 2004/0157255 | A1 | | 8/2004 | Agus et al. |
| 2005/0071300 | A1 | | 3/2005 | Bartlett et al. |

OTHER PUBLICATIONS

Censored Time Trees/spl trade/ for predicting time to PSA recurrence Zubek, V.B.; Verbel, D.; Machine Learning and Applications, 2005. Proceedings. Fourth International Conference on Dec. 15-17, 2005 p. 6 pp. Digital Object Identifier 10.1109/ICMLA.2005.14.*

DNA ploidy and cell cycle distribution of breast cancer aspirate cells measured by image cytometry and analyzed by artificial neural networks for their prognostic significanceNaguib, R.N.G.; Sakim, H.A.M.; Lakshmi, M.S.; Wadehra, V.; Lennard, T.W.J.; Bhatavdekar, J.; Sherbet, G.V.; Information Technology in Biomedicine, IEEE Transactions on vol. 3.*

Dynamic magnetic resonance imaging of tumor perfusion Collins, D.J.; Padhani, A.R.; Engineering in Medicine and Biology Magazine, IEEE vol. 23, Issue 5, Sep.-Oct. 2004 pp. 65-83 Digital Object Identifier 10.1109/MEMB.2004.1360410.*

Ablameyko S., et al. "From cell image segmentation to differential diagnosis of thyroid cancer", Pattern Recognition, 2002. Proceedings. 16th International Conference on Quebec City, Que., Canada Aug. 11-15, 2002, Los Alamitos, CA, USA, IEEE Compout. Soc, Us, vol. 1, Aug. 11, 2002, pp. 763-766.

M. Antonini, et al., "Image coding using wavelet transform," IEEE Trans. Image Process., vol. 1, pp. 205-220, 1992.

Baatz M., et al., "Multiresolution Segmentation—An Optimization Approach for High Quality Multi-scale Image Segmentation," In Angewandte Geographische Informationsverarbeitung XII, Strobl, J., Blaschke, T., Griesebner, G. (eds.), Wichmann—Verlag, Heidelberg, pp. 12-23, 2000.

E. Biganzoli, et al. Feed forward neural networks for the analysis of censored survial data: a partial logistic regression approach. Stat Med, 1998.

S.F. Brown, et al. On the use of artificial neural networks for the analysis of survival data. IEEE Trans. on Neural Networks, 8(5):1071-1077, 1997.

H.B. Burke, et al. Artificial neural networks improve the accuracy of cancer survival prediction. Cancer, 97(4): pp. 857-862, 1997.

Brown, et al. Knowledge-based analysis of microarray gene expression data by using support vector machines. Proc Natl Acad Sci U S A 97:262-7, 2000.

E. Davidow, et al. Advancing drug discovery through systems biology. Drug Discov Today, 8:175-183, 2003.

I. Daubechies, Ten Lectures on Wavelets, SIAM, Philadelphia, PA, 1992, pp. 198-202 and pp. 254-256.

Definiens Cellenger Architecture: A Technical Review, Apr. 2004.

C.J. S. deSilva, et al. Artificial neural networks and breast cancer prognosis. Australian Comput. J. 26:78-81, 1994.

J. Diamond, et al., "The use of morphological characteristics and texture analysis in the identification of tissue composition in prostatic neoplasia," Human Pathology, vol. 35, pp. 1121-1131, 2004.

R.O. Duda, et al., Pattern Classification, 2nd ed. Wiley, New York, 2001, pp. 483-484.

Egmont-Petersen M. et al ., "Image Processing with Neural Networks-a-Review", Pattern Recognition, Elsevier, Kidlington, GB, vol. 35, No. 10, Oct. 2002, pp. 2279-2301.

U.M. Fayyad, et al. Knowledge Discovery and Data Mining : Towards a unifying framework. In Proceedings of the Second International Conference on Knowledge Discovery and Data Mining, Portland, 1996. AAAI Press.

K. Fukunaga, Introduction to Statistical Pattern Recognition, 2nd ed. New York: Academic, 1990, p. 125.

Graefen M., et al. International validation of a preoperative nomogram for prostate cancer recurrence after radical prostatectomy. J. Clin Oncol 20:3206-12, 2002.

Graefen M., et al. A validation of two preoperative nomograms predicting recurrence following radical prostatectomy in a cohort of European men. Urol Oncol 7:141-6, 2002.

Graefen, M., et al. Validation study of the accuracy of a postoperative nomogram for recurrence after radical prostatectomy for localized prostate cancer. Journal of Clin Oncol, 20:951-956, 2002.

R.C. Gonzales, et al., Digital Image Processing. Addison-Wesley, New York, 1992, pp. 173-185.

H. Gronberg. Prostate cancer epidemiology, Lancet, 361:859-864, 2003.

Guyon I, et al. Gene selection for cancer classification using support vector machines. Machine Learning 1:S316-22, 2002.

Halabi S, et al. Prognostic model for predicting survival in men with hormone-refractory metastatic prostate cancer. J. Clin Oncol 21:1232-7, 2003.

William S. Harlan, "Optimization of a Neural Network", Feb. 1999 (5 pp.) accessed at http://billharlan.com/pub/papers/neural/ on Mar. 1, 2006.

F.E. Harrell, et al. Evaluating the yield of medical tests. JAMA, 247(18):2543-2546, 1982.

F.E. Harrell, Regression Modeling Strategies, Springer-Verlag 2001, pp. 247 and 493.

L. Hood. Systems biology: integrating technology, biology, and computation. Mech Ageing Dev, 124:9-16, 2003.

A.E. Jacquin, "Fractal image coding: A review,"*Proc. IEEE*, vol. 81, pp. 1451-1465, 1993.

Kaplan E.L., et al. (1958), "nonparametric Estimation from Incomplete Observatinos," JASA, 53, pp. 457-481.

M. W. Kattan, et al. Postoperative nomogram for disease recurrence after radical prostatectomy for prostate cancer. *Journal of Clin Oncol*, 17:1499-1507, 1999.

M.W. Kattan, et al. Experiments to determine whether recursive partitioning or an artificial neural network overcomes theoretical limitation of cox proportional hazards regression. *Comput Biomed Res*, 31(5):363-373, 1998.

M.W. Kattan, et al. << A preoperative nomogram for disease recurrence following radical prostatectomy for prostate cancer. J. Natl.Cancer Inst. 90:766-771, 1998.

K. Jafari-Khouzani, et al. "Multiwavelet grading of pathological images of prostate," *IEEE Trans. Biomed. Eng.*, vol. 50, pp. 697-704, 2003.

Kim K.S. et al., "Automatic classification of cells using morphological shape in peripheral blood images", Proceedings of the SPIE—the international society for optical engineering spie-int. soc. Opt. eng USA, vol. 4210, 2000, (290-298 pp).

J.P. Klein, et al. *Survival Analysis: Techniques for Censored and Truncated Data*. Springer, New York, 1997, pp. 247-335.

G. Landini "Applications of fractal geometry in pathology," in *Fractal Geometry in Biological Systems: An Analytical Approach*, P.M. Iannaccone and M. Kohokha, Eds. CRC Press, Boca Raton, FL, 1996, pp. 205-246.

A. Laine, et al., "Texture classification by wavelet packet signatures," *IEEE Trans. Pattern Anal. Machine Intell.*, vol. 15, pp. 1186-1191, 1993.

D.C. Liu, et al. On the limited memory bfgs method for large scale optimization. *Mathematical Programming*, 45:503-528, 1989.

N. Lu, *Fractal Imaging*. Academic, San Diego, CA 1997.

L. Ohno-Machado, et al. Modular neural networks for medical prognosis: Quantifying the benefits of combining neural networks for survival prediction. *Connection Science*, 9:71-86, 1997.

Mohler JL, et al. Nuclear roundness factor measurement for assessment of prognosis of patients with prosatatic carcinoma. I. Testing of a digitization system. J. Urol 139:1080-4, 1988.

Olinici CD, et al. Computer-based image analysis of nucleoli in prostate carcinoma. Rom J. Morphol Embryol 43:163-7, 1997.

E.E. Osuna, et al. Support Vector Machines : Training and Applications. A.I. Memo 1602/C.B.C.L. Paper 144, MIT, 1997.

Partin AW, et al. Use of nuclear morphometry, Gleason histologic scoring, clinical stage, and age predict disease-free survival among patients with prostate cancer. Cancer 70:161-168, 1992.

M.A. Roula, et al., "A multispectral computer vision system for automatic grading of prostatic neoplasia," in *Proc. Proc. IEEE Int. Symp. Biomed. Imaging*, Washington, DC, 2002, pp. 193-196.

Sabino D M U et al., "Toward leukocyte recognition using morphometry, texture and color", Biomedical Imaging: Macro To Nano, 2004. IEEE International Symposium on Arlington Va, USA Apr. 15-18, 2004, Piscataway, NJ USA, IEEE, Apr. 15, 2004, pp. 121-124.

Scher HI, et al. Clinical states in prostate cancer: towards a dynamic model of disease progression. Urology 55:323-327, 2000.

Schoelkopf B. et al., "Comparing Support Vector Machines With Gaussian Kernels to Radial Basis Function Classifiers", IEEE Transactions on Signal Processing, IEEE Service Center, New York, NY, US, vol. 45, No. 11, Nov. 1997, pp. 2758-2765.

B.A.M. Schouten, et al., "Feature extraction using fractal codes," in *Proc. Int. Conf. Visual Information and Information Systems*, Amsterdam, 1999, pp. 483-492.

A. Sloan, "Retrieving database contents by image recognition: New fractal power," *Advanced Imaging*, vol. 5, pp. 26-30, 1994.

Smaletz O, et al., Nomogram for overall survival of patients with progressive metastatic prostate cancer after castration. J. Clin Oncol 20:3972-82, 2002.

Y. Smith, et al., "Similarity measurement method for the classification of architecturally differentiated images," *Comp. Biomed. Res.*, vol. 32, pp. 1-12, 1999.

P. Snow, et al. Artificial neural networks in the diagnosis and prognosis of prostate cancer: a pilot study. *J. Urology*, 152(5):1923-1926, 1997.

Stephenson RA, et al. An image analysis method for assessment of prognostic risk in prostate cancer: a pilot study. Anal Cell Pathol 3:243-8, 1991.

R. Stotzka, et al., "A hybrid neural and statistical classifier system for histopathologic grading of prostate lesions," *Anal. Quant. Cytol. Histol.*, vol. 17, pp. 204-218, 1995.

M. Teverovskiy, et al., "Improved prediction of prostate cancer recurrence base on an automated tissue image analysis system," in Proc. *IEEE Int. Symp. Biomed. Imaging*, Arlington, VA, 2004, pp. 257-260.

Tong, Zhao et al., "A novel scheme for abnormal cell detection in pap smear images". Proceedings of the Spie—The International Society for Optical Engineering SPIE-INT. Soc. Opt. Eng USA, vol. 5318, No. 1, Jul. 2004, pp. 151-162.

Veltri RW, et al. Quantitative nuclear grade (QNG) : a new image anaysis-based biomarker of clinically relevant nuclear structure alterations. J Cell Biochem Suppl 35:151-7, 2000.

Veltri RW, et al., Ability to predict biochemical progression using Gleason score and a computer-generated quantitative nuclear grade derived form cancer nuclei. Urology 48:685-91, 1996.

Veltri RW, et al. Quantitative nuclear morphometry, Markovian texture descriptors, and DNA content captured on a CAS-200 Image analysis system, combined with PCNA and HER-2/neuimmunohistochemistry for prediction of prostate cancer progression. J. Cell Biochem Suppl 19:249-58, 1994.

I. Yan, et al., "Optimizing classifier performance via an approximation function to the Wilcoxon-mann-whitney statistic," *Proc. Of 20th Int'l Conf. Machine Learning*, pp. 848-855, 2003.

Yeh W-C et al., << Liver fibrosis grade classification with B-mode ultrasound >> Ultrasound in Medicine and Biology, New York, NY, US, vol. 29, No. 9 Sep. 2003, pp. 1229-1235.

Wang N., et al. Morphometry of nuclei of the normal and malignant prostate in relation to DNA ploidy. Anal Quant Cytol Histol 14:210-6, 1992.

A.W. Wetzel, et al. "Evaluation of prostate tumor grades by content-based image retrieval," in *Proc. SPIE AIPR Workshop on Advances in Computer-Assisted Recognition*, vol. 3584, Washington, DC, 1999, pp. 244-252.

Daniel Cho, M.D. et al., "Prognostic factors for survival in patients with hormone-refractory prostate cancer (HRPC-after initial androgen deprivation therapy," *Urologic Oncology: Seminars and Original Investigation*, vol. 21, pp. 282-291, 2003.

R. Jüri Palisaar et al., "Assessment of Clinical and Pathologic Characteristics Predisposing to Disease Recurrence Following Radical Prostatectomy in Men with Pathlogically Organ-Confined Prostate Cancer," *European Urology*, vol. 41, pp. 155-161, 2002.

Anny Xiang, Pablo LaPuerta, Alex Ryutov, Jonathan Buckley, Stanley Azen, "Comparison of the performance of neural network methods and Cox regression for censored survival data," *Computational Statistics & Data Analysis*, vol. 34, pp. 243-257, 2000.

Stacy L. Özesmi, Uygar Özesmi, "An artificial neural network approach to spatial habitat modelling with intersecific interaction," *Ecological Modelling*, vol. 116, pp. 15-31, 1999.

\* cited by examiner

Figure 1: $R(\hat{t}_i, \hat{t}_j)$ compares with $I(\hat{t}_i, \hat{t}_j)$. The horizontal axis is $\hat{t}_i - \hat{t}_j$. $\gamma = 0.1$ and $n = 2$ in $R(\hat{t}_i, \hat{t}_j)$.

Figure 2: The comparison of survival curves for the high-risk and low-risk patient groups between $NN_{ci}$ and $NN_{km}$. Note that the low risk group of $NN_{km}$ consists of 84 patients because of tied scores.

Figure 3: The comparison of survival curves for the high-risk and low-risk patient groups between $NN_{ci}$ and $NN_{ae}$.

Figure 4: The comparison of survival curves for the high-risk and low-risk patient groups between $NN_{ci}$ and $SVR_c$.

Figure 5: The comparison of survival curves for the high-risk and low-risk patient groups between $NN_{ci}$ and the Cox model.

Figure 6: A nomogram based on the score from the $NN_{ci}$ model.

FIG. 7

METHODS AND SYSTEMS FOR PREDICTING OCCURRENCE OF AN EVENT

CLAIM TO PRIORITY—RELATED APPLICATIONS

The present invention claims priority under 35 U.S.C. §119(e) of U.S. provisional patent application No. 60/548,322, filed Feb. 27, 2004, and U.S. provisional patent application No. 60/577,051, filed Jun. 4, 2004, each disclosure of which is herein incorporated by reference.

FIELD OF THE INVENTION

Embodiments of the invention relate to event occurrence analysis and in particular eventual event occurrence analysis that can make use of both censored data and uncensored data for predicting a recurrence of a disease, for example, including cancer.

BACKGROUND OF THE INVENTION

There are many instances in which it is desirable to predict the likelihood of an event occurring within a certain amount of time or the amount of time until an event is likely to occur. Indeed, event prediction type data, including censored data, is one of the most common types of data used in bioscience (for example). Predicting the occurrence of an event can help people plan for the occurrence of the event. For example, it is desirable to predict the time to recurrence of diseases or other health issues, such as cancer, or environmental events (e.g., earthquakes, hurricanes).

Censored data comprises incomplete data in which it is unknown when an event occurred/recurred. For example, in training a model to predict the recurrence of cancer in a patient, the training data would preferably include censored data comprising patient data in which no recurrence of cancer came about in particular patients. This is because most medical data includes both censored and non-censored data, and increasing the amount of data available to train a predictive model can increase the reliability and predictive power of the model. Censored data indicates whether the outcome under observation, e.g., recurrence of cancer, has occurred (for example) within a patient's follow-up visit time: if the recurrence of cancer has not been observed at a patient's follow-up visit, this patient's data is censored. In predicting recurrence of cancer (in patients who have been considered cured, for example), data for many patients may be censored. Such censored observation provides incomplete information about the outcome, since the event may eventually occur after the follow-up visit, which should be taken into account by a predictive model. However, the current most accurate learning models, particularly machine learning techniques involving neural networks and support vector machines, do not make use of such censored data.

It would be highly desirable when training a predictive model to have as much data from as many sources as possible. Thus, for example, for disease related events, it is generally desirable to have data from as many patients as possible, and as much data from each patient as possible. With such data, however, come difficulties in how to process censored data.

Typically, traditional survival analysis, e.g., the Cox proportional hazards model, uses censored data. However, in general, the reliability of the Cox model deteriorates if the number of features is greater than the number of events divided by 10 or 20 [1]. For example, in one study included as an example for the present invention, the dataset consisted of only 130 patients, each of which was represented by a vector of 25 features. For such data, the Cox model could not be successfully derived from this dataset until the feature dimensionality was reduced.

Neural networks have been shown to be able to outperform traditional statistical models, due to neural networks' capacity to model nonlinearities. However, in order to be successful, a neural network typically requires a large number of samples in the training set. Generally, several approaches have been used in applying survival data in neural networks. One approach is to model the hazard or survival function as a neural network structure. For example, constructing the survival curve by a hazard function modeled by a neural network, for which the ith output is the estimated hazard at the discretized time interval i. Others have used the discretized time interval as an additional input to a neural network to model the survival probability. Still others have used several separately trained networks, each used to model the hazard function at a different time interval.

Still, in order to effectively use machine learning algorithms, treatment of censored data is crucial. Simply omitting the censored observations or treating them as non-recurring samples biases the resulting model and, thus, should be avoided. Kaplan-Meier estimates of event probability have been used as target values during training for patients who had short follow-up times and did not have the event recurred. Although this algorithm takes into account, to some extent, both follow-up time and censoring, it still fails to make complete use of available information. For instance, it treats two recurred patients as the same regardless of their survival time.

SUMMARY OF THE INVENTION

The present invention presents systems and methods to improve prediction of an occurrence of an event that may use both censored and non-censored data. The treatment of censored data in the present invention allows for the effective use of machine learning algorithms, e.g., neural networks, for the analysis of survival data to produce an effective predictive model, for example. In particular, some embodiments of the present invention may be used to indicate how likely an event will eventually occur.

In particular, some embodiments of the present invention are directed to supervised learning models which use an objective function to improve the predictive accuracy of the model. One such novel objective function may be an approximation of the concordance index (CI). Using an approximation to the CI allows the model to make use of the information from both censored and non-censored observations, thereby reducing event occurrence prediction into simpler predication/classification problem. Accordingly, such an approximation to the CI for the objective function may be a derivative of the CI.

Embodiments of the present invention have particular application to the prediction of the occurrence and, in particular, the recurrence of cancer after a patient has been initially cured (e.g., following removal and/or treatment of the cancer). Being able to make a more precise prediction on cancer recurrence allows for a more effective follow-up therapy to be administered to the patient. Accordingly, embodiments of the invention may be able to determine a prognostic estimate for an individual patient. Comparing embodiments of the present invention with the traditional Cox proportional hazards model (and several other algorithms based on neural networks and support vector machines, see below), the present invention may achieve improvement in being able to identify high-risk and low-risk groups of patients.

Accordingly, in a first group of embodiments of the present invention, a supervised model (e.g., predictive, prognostic) for a neural network is provided and may include one or more of the following components: a neural network having weighted connections, an input for receiving training data and an output, an error module for determining an error between output of the neural network and a desired output from the training data, an objective function for providing a rating of the performance of the model, the objective function comprising a function C substantially in accordance with a derivative of the concordance index and a training algorithm for adapting the weighted connections of the neural network in accordance with the results of the objective function. The input training data may include one or more features (clinical, molecular, image) for each of a plurality of known patients. Output data may include, for example, a predicitive or prognostic determination for each of the patients.

In a second group of embodiments of the invention, a method for predicting recurrence of cancer in a patient is provided and may comprise estimating the probability that cancer will recur within a shorter period of time in a patient with a higher prognostic score than a recurrence time in a patient with a lower prognostic score. Estimating may include conducting pair-wise comparisons between prognostic scores for patients i and j, using a neural network trained using an objective function comprising a function C substantially in accordance with a derivative of the concordance index.

In a third group of embodiments of the present invention, a method for training a neural network having weighted connections for classification of data is provided and may include inputting input training data into the neural network, processing, by the neural network, the input training data to produce an output, determining an error between the output and a desired output corresponding to the input training data, rating the performance neural network using an objective function, wherein the objective function comprises a function C substantially in accordance with a derivative of the concordance index and adapting the weighted connections of the neural network based upon results of the objective function.

In any of the above groups of embodiments, the function C may comprise $$C = \frac{\sum_{(i,j)\in\Omega} R(\hat{t}_i, \hat{t}_j)}{|\Omega|},$$

wherein $\Omega$ comprises pairs of data (i, j) meeting one or more predetermined conditions, or $$C = \frac{\sum_{(i,j)\in\Omega} -(\hat{t}_i - \hat{t}_j) \cdot R(\hat{t}_i, \hat{t}_j)}{D}, \text{ where}$$

$$D = \sum_{(i,j)\in\Omega} -(\hat{t}_i - \hat{t}_j),$$

may be a normalization factor, and $\Omega$ may comprise pairs of data (i, j) meeting one or more predetermined conditions. In the above equation, $t_i$ and $t_j$ represent estimates by the neural network of how long it will take for patients i and j to recur, respectively.

Moreover, any of the above groups of embodiments may be used, or modified to be used, to determine a prediction of the recurrence of disease (e.g., cancer). In such cases, the pairs of data may comprise patients {i, j} and the predetermined conditions may comprise at least: both patients i and j have experienced recurrence and the recurrence time $t_i$ of patient i is shorter than the recurrence time $t_j$ of patient j; or only patient i has experienced recurrence and $t_i$ is shorter than patient j's follow-up visit time $t_j$.

Other groups of embodiments may further include computer systems, computer readable media and computer application programs for carrying out any one or more of particular embodiments of the groups of embodiments listed above.

The present invention will become even clearer with reference to the attached figures, brief descriptions of which are provided below, and the following detailed description.

DETAILED DESCRIPTION OF THE EMBODIMENTS

Neural networks are a form of artificial intelligence which functions to imitate the way a human brain works. A neural network typically comprises a plurality of weighted, interconnected processing elements, to emulate neurons of a brain. The organization of the processing elements and the weights of the connections between the elements determine the output. Generally, neural networks may be effective for predicting events, but typically require large amounts of data to do so.

A supervised model (e.g., predictive, prognostic) for a neural network is used to train a neural network to solve particular problems, for example, to predict an occurrence of an event. The supervised learning model trains the neural network by providing it with inputs and desired outputs. These inputs and desired outputs are referred to as training data. The difference between what is actually output by the network and the desired output is then used by a training algorithm in the model to change the weights of the connections between the processing elements to obtain the desired output.

Thus, the goal of the training a neural network is to find a function that, when training input data is applied to it, yields the desired output for the given input from the training data.

Figure 7:
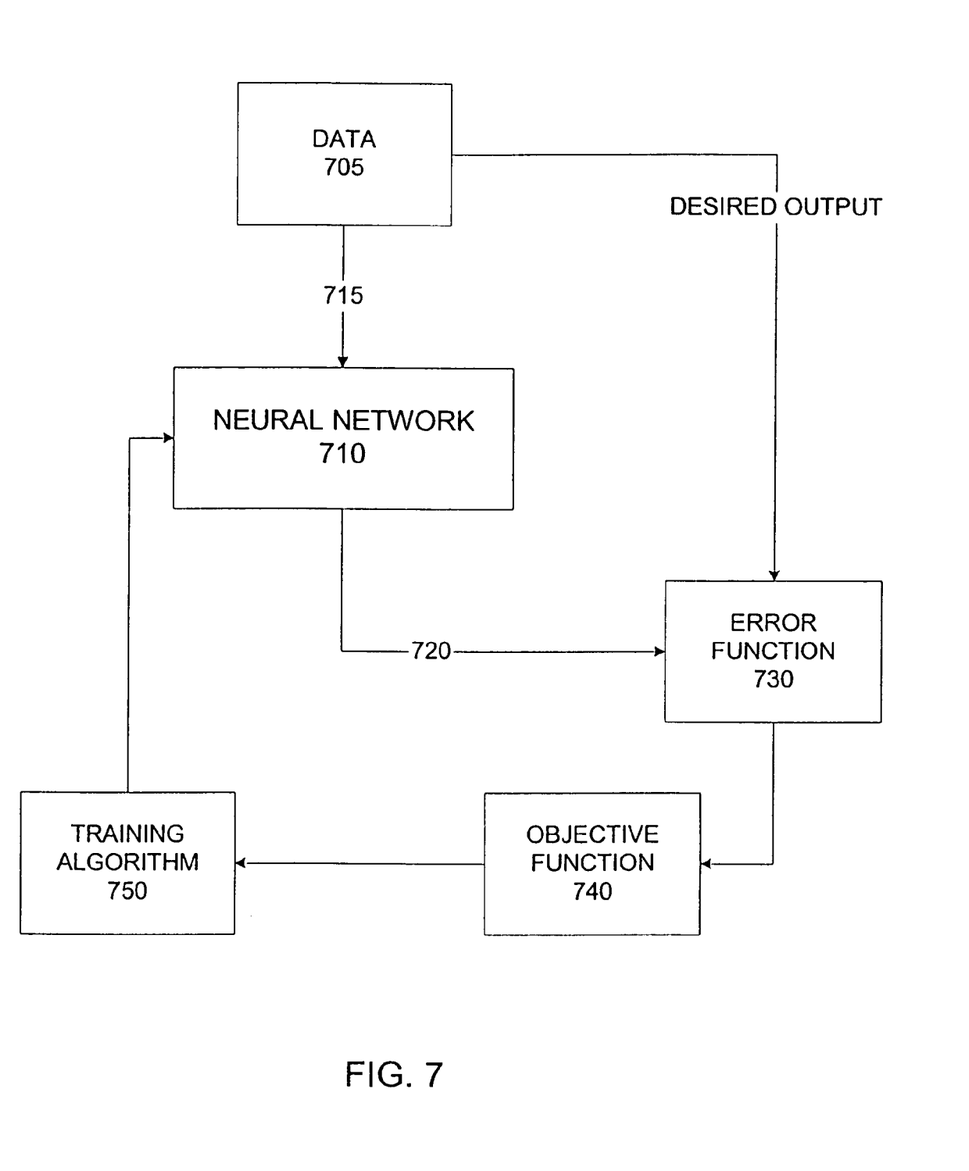
FIG. 7 is a general schematic of a supervised learning model for a neural network.

It can then be used to input data to seek output in accordance with the found function. As shown in FIG. 7, a supervised learning model 700 generally includes a neural network 710 having weighted connections, an input 715 for receiving training data 705 (input training data) and an output 720, an error function 730 for determining an error between output of the neural network and a desired output from the training data (output training data), an objective function 740 for providing a rating of the performance of the model, the objective function comprising a function C substantially in accordance with a derivative of the concordance index and a training algorithm 750 (i.e., optimization method) for adapting the weighted connections of the neural network in accordance with the results of the objective function.

Prediction of an Event: Cancer Recurrence Example

The present description is in reference to training a neural network using an objective function according to embodiment of the present invention. The neural network may comprise a typical multilayer perception (MLP) with softmax outputs and a single hidden layer and direct connection between the input and output layers. Please note, however, that the invention is not so limited to such a network, and may be applied to any neural network platform/arrangement.

Embodiments of the present invention enable improved prediction models by using an approximation (e.g., a derivative) of the concordance index (CI), as the objective function in training a neural network in a supervised learning model. Once trained, such models (and systems/methods which operate under such a model) may be used to estimate the probability that, of a pair of randomly chosen comparable patients, cancer will recur within a shorter period of time in one patient with a higher prognostic score than the other patient. In that regard, such use of a derivative of the CI as the objective function in supervised learning model during training allows such models to make use of the training information from both censored (event has not recurred) and non-censored (event has occurred) observations.

The Concordance Index

The concordance index may be expressed in the form:

$$CI = \frac{\sum_{(i,j) \in \Omega} I(\hat{t}_i, \hat{t}_j)}{|\Omega|}, \text{ where} \quad (1)$$

$$I(\hat{t}_i, \hat{t}_j) = \begin{cases} 1: \hat{t}_i > \hat{t}_j \\ 0: \text{otherwise} \end{cases}, \quad (2)$$

and may be based on pair-wise comparisons between the prognostic estimates $\hat{t}_i$ and $\hat{t}_j$ for patients i and j, respectively. Here, $\Omega$ consists of all the pairs of patients {i, j} who meet any of the following conditions:

both patients i and j experienced recurrence, and the recurrence time $t_i$ of patient i is shorter than patient j's recurrence time $t_j$; or only patient i experienced recurrence and $t_i$ is shorter than patient j's follow-up visit time $t_j$.

In other words, the numerator of the CI represents the number of times that the patient predicted to recur earlier by the neural network actually does recur earlier. The denominator is the total number of pairs of patients who meet the predetermined conditions.

Though the CI has long been used as a performance indicator for survival analysis, it has never been used as an objective function in a supervised learning model for a neural network to allow complete use of information from both censored and non-censored observations, as in embodiments of the present invention. The difficulty of using the CI as a training objective function in the past is that it is non-differentiable (i.e., the step function cannot be differentiated) and cannot be optimized by gradient-based methods. The present invention overcomes this obstacle by using an approximation of the CI as the objective function.

Figure 1:
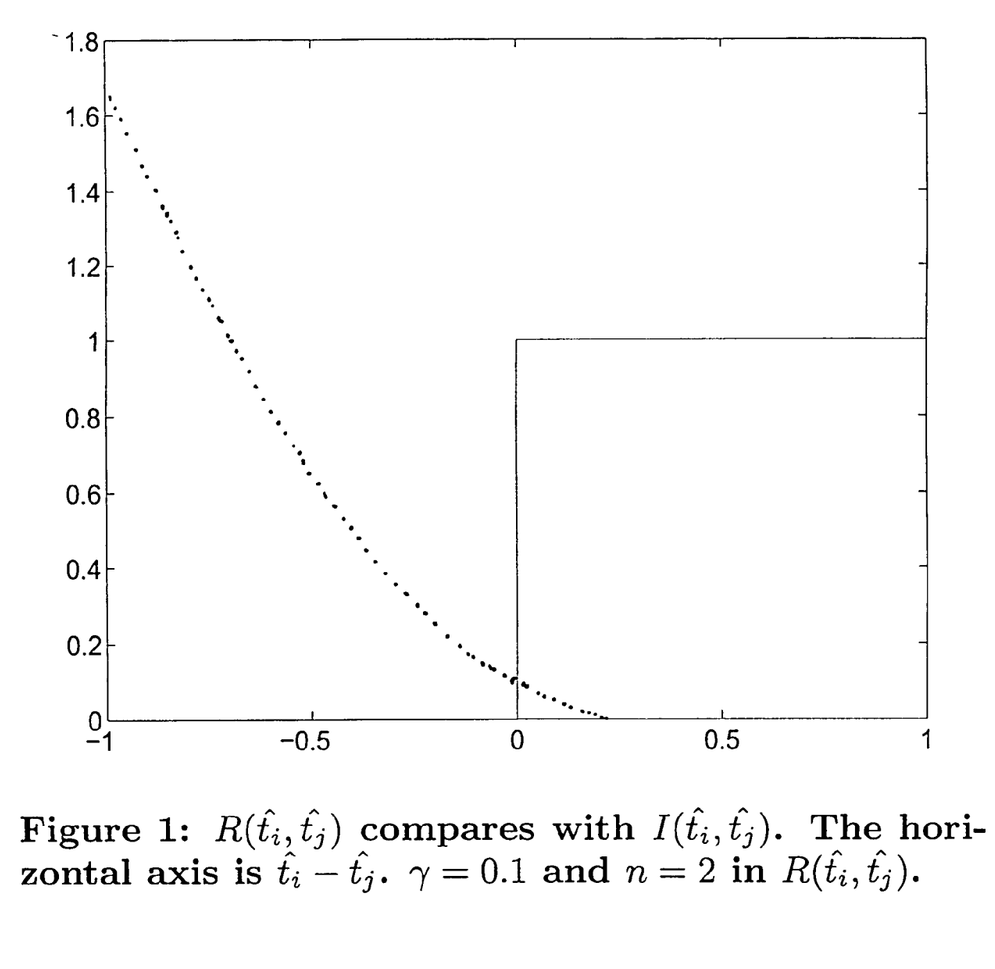
FIG. 1 is a chart illustrating a comparison of $R(\hat{t}_i, \hat{t}_j)$ with $I(\hat{t}_i, \hat{t}_j)$; the horizontal axis being $\hat{t}_i - \hat{t}_j$, $\gamma = 0.1$ and $n = 2$ in $R(\hat{t}_i, \hat{t}_j)$.
Figure 2:
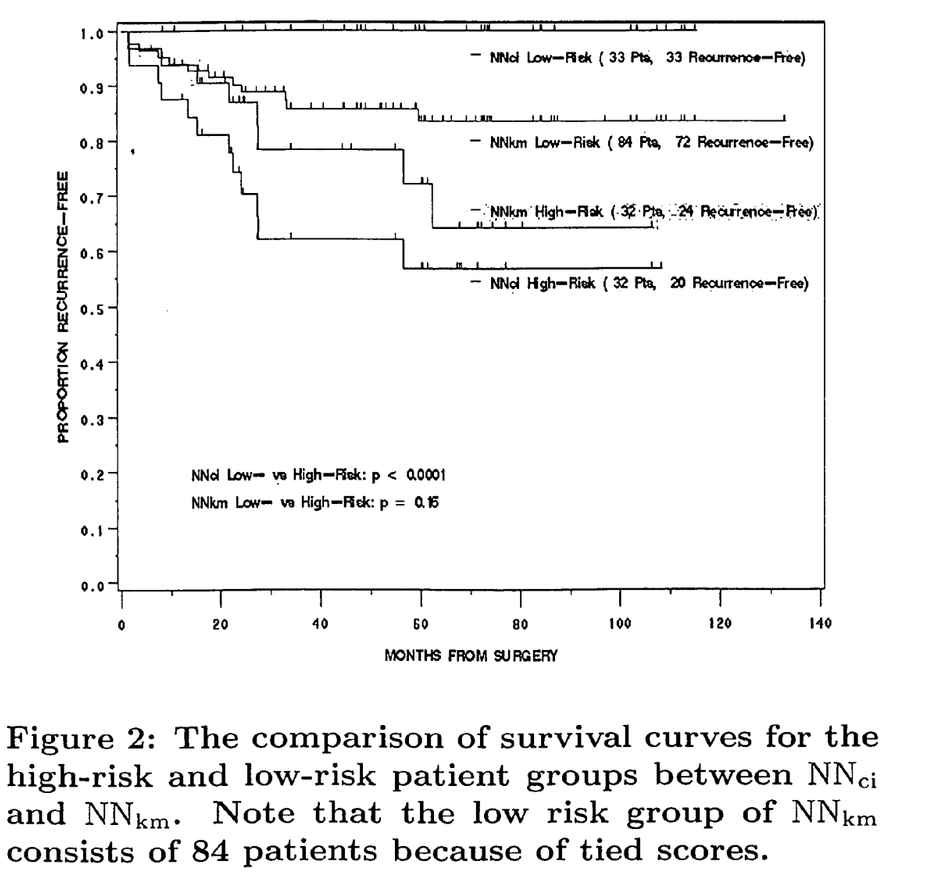
FIG. 2 is a chart illustrating a comparison of survival curves for high-risk and low-risk patient groups between $NN_{ci}$ and $NN_{km}$.
Figure 3:
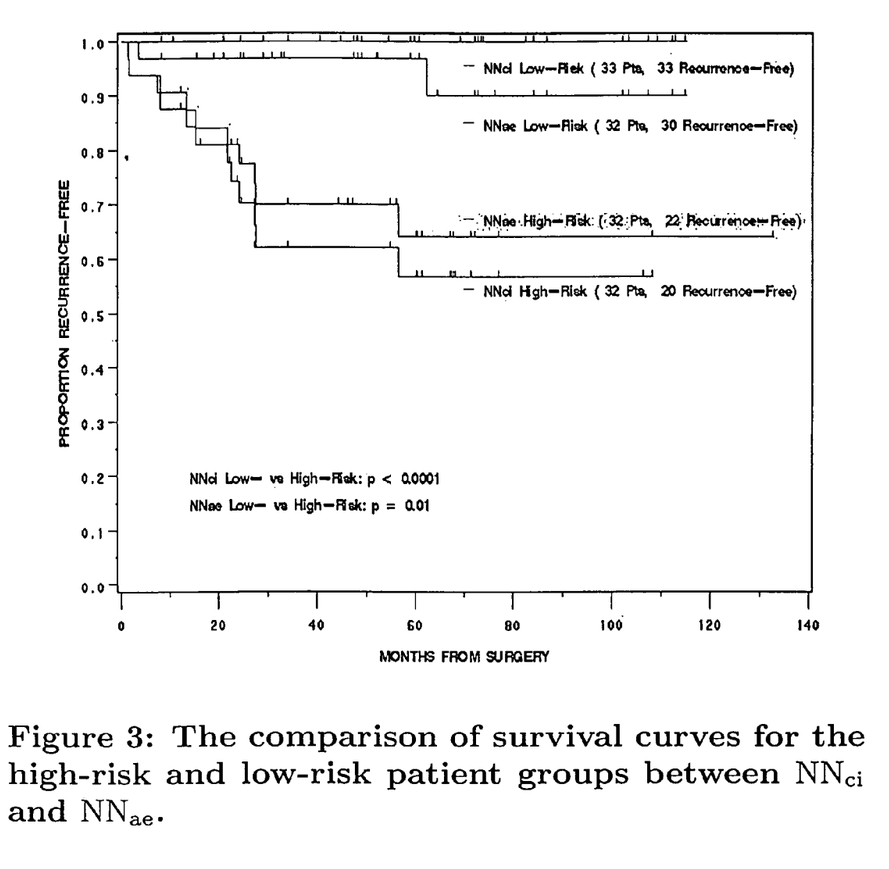
FIG. 3 is a chart illustrating a comparison of survival curves for high-risk and low-risk patient groups between $NN_{ci}$ and $NN_{ae}$.
Figure 4:
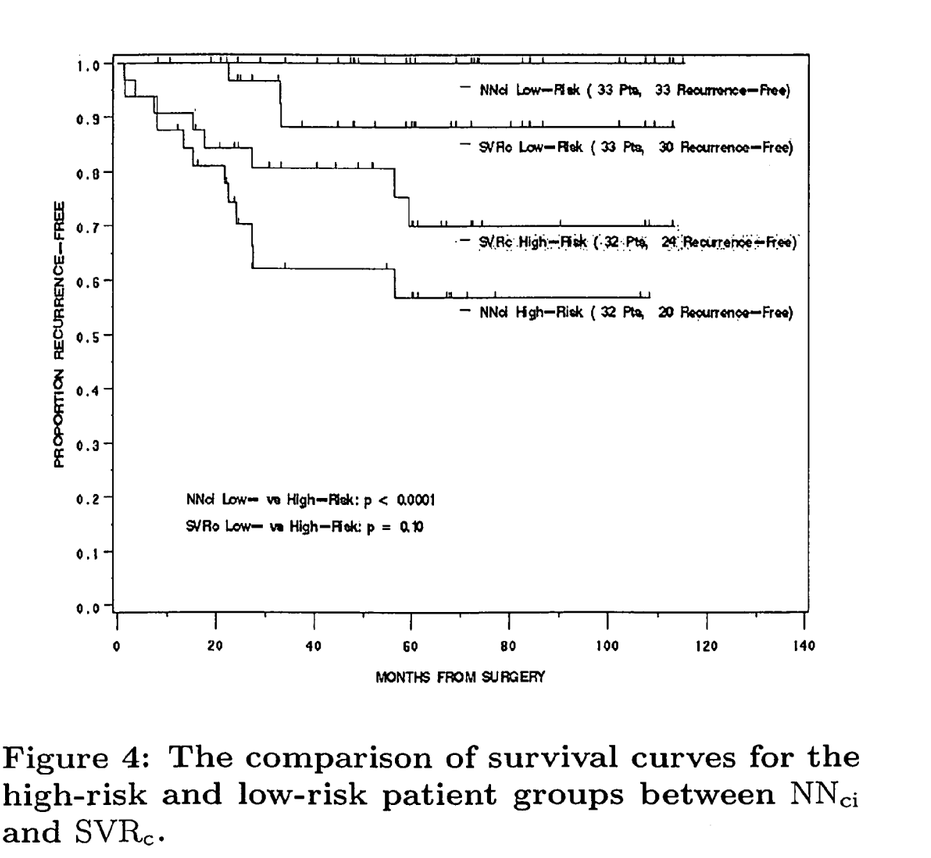
FIG. 4 is a chart illustrating a comparison of survival curves for high-risk and low-risk patient groups between $NN_{ci}$ and $SVR_c$.
Figure 5:
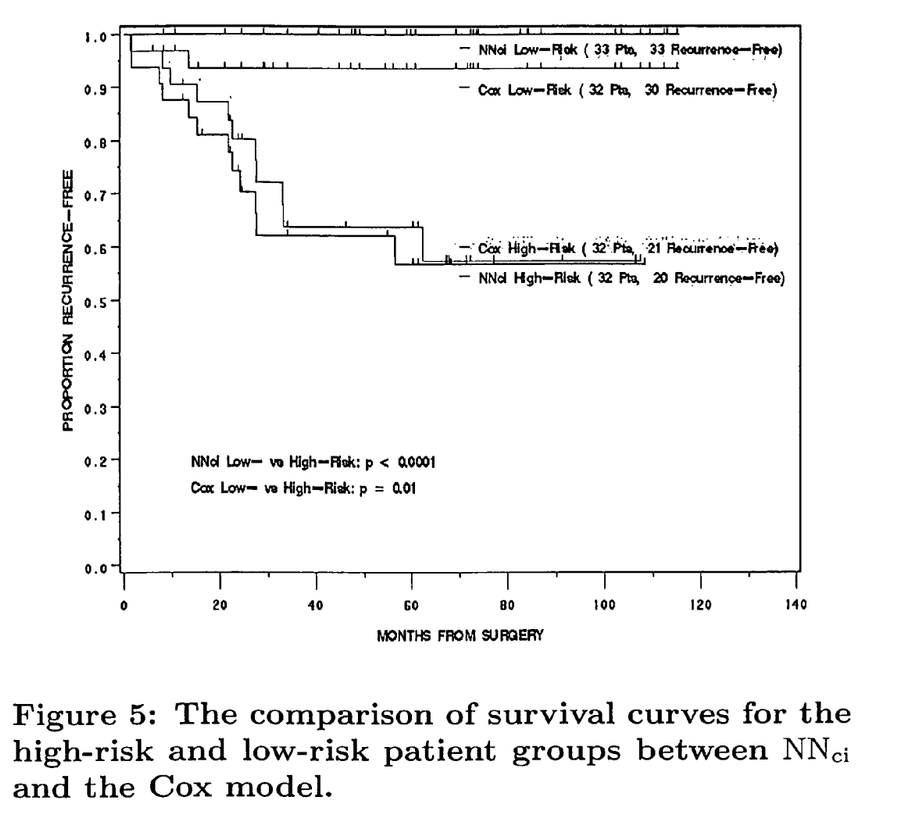
FIG. 5 is a chart illustrating a comparison of survival curves for high-risk and low-risk patient groups between $NN_{ci}$ and the Cox model.

As briefly stated above, the accuracy of a predictive model can be determined by using the CI: when the CI is maximized, the model is more accurate. Thus, by preferably substantially maximizing the CI, the performance of a model is maximized. Accordingly, a differentiable approximation to the step function in Eq. (2) has been proposed in [2] to directly optimize the AUC. In [2], several alternative approximations to eq. 2 are discussed in the context of approximating the Wilicoxon-Mann-Whitney statistic, which is different from the concordance index [3]. An intuitive choice of the discussed approximations is the sigmoid function:

$$S(\hat{t}_i, \hat{t}_j) = \frac{1}{1 + e^{-\beta(\hat{t}_i - \hat{t}_j)}}, \quad (4)$$

where $\beta > 0$. However, this is found to be less effective than the following function:

$$R(\hat{t}_i, \hat{t}_j) = \begin{cases} (-(\hat{t}_i - \hat{t}_j - \gamma))^n : \hat{t}_i - \hat{t}_j < \gamma \\ 0: \text{otherwise} \end{cases}, \quad (5)$$

where $0 < \gamma \leq 1$ and $n > 1$. $R(\hat{t}_i, \hat{t}_j)$ can be regarded as an approximation to $I(-\hat{t}_i, -\hat{t}_j)$. An example of $R(\hat{t}_i, \hat{t}_j)$ with $I(\hat{t}_i, \hat{t}_j)$ is shown in FIG. 1. Thus, in order to maximize the CI in Eq. (1), a prognostic model is trained by minimizing the objective function:

$$C = \frac{\sum_{(i,j) \in \Omega} R(\hat{t}_i, \hat{t}_j)}{|\Omega|}. \quad (6)$$

Empirically, it has been found that a weighted version of C in the following form, according to some embodiments, achieves improved results:

$$C_\omega = \frac{\sum_{(i,j) \in \Omega} -(\hat{t}_i - \hat{t}_j) \cdot R(\hat{t}_i, \hat{t}_j)}{D}, \text{ where} \quad (7)$$

$$D = \sum_{(i,j) \in \Omega} -(\hat{t}_i - \hat{t}_j), \quad (8)$$

is the normalization factor. Here each $R(\hat{t}_i, \hat{t}_j)$ is weighted by the difference between $\hat{t}_i$ and $\hat{t}_j$. The process of minimizing the $C_\omega$ (or C) seeks to move each pair of samples in $\Omega$ to satisfy $\hat{t}_i - \hat{t}_j > \gamma$ and thus to make $I(\hat{t}_i, \hat{t}_j) = 1$ in Eq. (1).

When the difference between the outputs of a pair in $\Omega$ is larger than the margin $\gamma$, this pair of samples will stop contributing to the objective function. This mechanism effectively overcomes over-fitting of the data during training of the model and makes the optimization preferably focus on only moving more pairs of samples in $\Omega$ to satisfy $\hat{t}_i - \hat{t}_j > \gamma$. The influence of the training samples is adaptively adjusted according to the pair-wise comparisons during training. Note that the positive margin $\gamma$ in R is preferable for improved generalization performance. In other words, the parameters of the neural network are adjusted during training by calculating the CI after all the patient data has been entered. The neural network then adjusts the parameters with the goal of minimizing the objective function and thus maximizing the CI. As used above, over-fitting generally refers to the complexity of the neural network. Specifically, if the network is too complex, the network will react to "noisy" data. Overfitting is risky in that it can easily lead to predictions that are far beyond the range of the training data.

Embodiments of the present invention, described above and further explained with reference to the example below, allow a supervised learning model to make complete use of information (censored and non-censored data) from survival data (for example) using a derivative of the CI as the objective function in training the neural network. Using embodiments of the present invention, improvement may be achieved in identifying high-risk and low-risk groups of patients in a cancer recurrence predictive model (for example). Moreover, embodiments of the present invention may be applicable for use in the approximation in a more general problem of learning ranks, where an objective function based on a step function can be formed.

The above description and example given below is considered as illustrative only of the principles of the various embodiments of the invention. Further, since numerous modifications and changes will readily occur to those skilled in the art, the invention is not limited to the exact construction and operation shown and described, and accordingly, all suitable modifications and equivalents may be resorted to, falling within the scope of the invention.

Prostate Cancer Study

Prostate cancer (PCa) is a malignant tumor that usually begins in the outer-most part of the prostate and is the most common form of cancer found in American men. More than 180,000 in the U.S. will be diagnosed with prostate cancer this year, and more than 30,000 will die of the disease. While the number of men diagnosed with prostate cancer remains high, survival rates have been steadily improving primarily due to early detection. Eighty-nine percent of the men diagnosed with the disease will survive at least five years, while 63% will survive 10 years or longer.

The American Urological Association and the American Cancer Society recommend annual screening for men ages 50 to 70. The most effective screening tests available include a blood test for an enzyme called prostate-specific antigen (PSA) which is produced by the prostate gland and the employment of a digital rectal exam (DRE). Elevated PSA levels (>4 ng/ml or greater) may indicate prostate cancer. However, increases in PSA are also reported in benign conditions such as prostatitis and a pathologic enlargement of the prostate known as benign proliferative hyperplasia (BPH). The standard of care once PCa is suspected is to obtain a biopsy, typically a sextant (six-part) biopsy to assess presence or absence of disease.

The most common treatment for localized or confined PCa, in men under the age 70 who do not have other health complications is a radical prostatectomy, i.e., surgery to remove the prostate gland, seminal vesicles, vas deferens and some surrounding tissue. After surgery, the PSA levels in the blood should be reduced to 0.2 ng/ml or less. If the PSA levels begin to rise at any time after treatment (also known as a biochemical recurrence BCR), a local or distant recurrence may be suspected, and will necessitate restaging the cancer, as well as a discussion of possible salvage therapies with the patient including radiation or hormonal therapy, experimental protocols or observation [4].

Thus, the ability to predict which patients will have a BCR would be very important to urologists and oncologists in managing the course of future treatment. A number of prostate cancer nomograms which combine clinical and/or pathologic factors to predict an individual patients probability of disease recurrence or survival have been published, e.g., [5] [6] [7]. The postoperative nomogram developed by Kattan et al. [5] is widely used by clinicians and allows a prediction of the probability of disease recurrence for patients who have received radical prostatectomy as treatment for prostate cancer.

The postoperative nomogram used Cox proportional hazards regression analysis to model the clinical and pathologic data and disease follow-up for men treated with radical prostatectomy by a single surgeon. Prognostic variables included pretreatment serum prostate-specific antigen level, radical prostatectomy Gleason sum, prostatic capsular invasion, surgical margin status, seminal vesicle invasion, and lymph node status. Treatment failure was recorded when there was clinical evidence of disease recurrence, a rising serum prostate-specific antigen level, or initiation of adjuvant therapy.

Despite the widespread use of the postoperative nomogram and its reasonable predictive accuracy, better tools are needed to predict an individual patients probability of disease recurrence after radical prostatectomy. Systems pathology or biology is a new discipline that is positioned to significantly impact biological discovery processes. This emerging approach attempts to facilitate discovery by systematic integration of technologies, gathering information at multiple levels (instead of only one) and examining complex interactions which results in a superior output of data and information, thereby enhancing our understanding of biological function and chemico-biological interactions [8].

The number of features generated by these technologies can be larger than standard survival methods can handle. Thus, the underlying hypothesis of this study is that an improved predictive model for disease recurrence after radical prostatectomy can be derived from a novel integrated or systems pathology approach, that will use neural networks to handle the expanded multidimensional sources of data input, including clinical and pathological variables (variables used in original nomogram plus additional clinical variables). Molecular biomarker data can also be derived for use from IHC analyses of tissue microarrays, as well as results of machine vision image analysis which quantitate histopathological features of H&E slides.

It has been found that clinical, histopathological, immunohistochemical (IHC), and bio-imaging data can be used to predict prostate cancer BCR. In order to achieve this objective, a cohort of 539 patients who underwent radical prostatectomy at a single hospital in the US was studied. 16 clinical and histopathological features were collected, which include patient age, race, Gleason grade and score, and other pre- and post-operative parameters. In addition, high-density tissue microarrays (TMAs) were constructed from the patients' prostatectomy specimens. A single hematoxylin and eosin-stained (H&E) slide for each patient was used for image analysis, while the remaining sections made from the paraffin-embedded tissue blocks were used to conduct IHC studies of selected biomarkers in the laboratory. Data generated by the IHC studies included the number of cells which stained positive for a particular biomarker, if any, and the level of intensity at which the cell(s) stained positive for the biomarker. 43 IHC features from 12 biomarkers were obtained and studied. Images of the H&E slides were captured via a light microscope at 20× magnification using a SPOT Insight QE Color Digital Camera (KAI2000).

Using a proprietary image analysis system, pathologically meaningful objects were identified and various statistical features associated with these objects were generated. Such objects include spectral-based characteristics (channel means, standard deviations, etc.), position, size, perimeter, shape (asymmetry, compactness, elliptic fit, etc.), and relationships to neighboring objects (contrast). In the end, 496 bio-imaging features were produced.

This study was restricted to those patients who had non-missing data for each of the above three domains (clinical and histopathological, IHC, and bioimaging). Thus, the effective sample size consisted of only 130 patients. For these patients, the time from the surgery to the most recent follow-up visit ranged from 1 month to 133 months. Patients who had measurable prostate-specific antigen (PSA) at this visit were considered to have recurrent prostate cancer. If a patient did not recur as of this last visit, or the patient outcome was unknown as of their most recent visit (e.g. due to loss to follow-up), then the patient outcome was considered censored, specifically right-censored.

Twenty (20) patients experienced PSA recurrence among the 130 patients, while the remaining patients were censored. Thus, the available sample was very small and heavily censored. By consulting domain experts and using an in-house domain specific feature selection procedure, which combines greedy forward selection and backward elimination based on the relevant importance of feature groups given by domain experts, the final feature set was reduced to 25 features.

The new training algorithm/model according to embodiments of the present invention, denoted as $NN_{ci}$, was compared with four other algorithms over the data collected. The first compared model used an algorithm based on the Kaplan-Meier estimate of recurrence probability, and is used as the target value for the patients who had short follow-up times and did not experience recurrence. The MLP network trained by this algorithm will be referred to as $NN_{km}$. The patients who had follow-up times longer than 7 years and remained disease free are assumed to be successfully cured and a target value of 0 is assigned to such patients. Those patients who had recurrence at the follow-up visit have a target value of 1. Like the new algorithm of the present invention, this model should output a higher score for a higher-risk patient.

The second compared model uses an algorithm that trains an MLP model to regress over the survival/censoring time. It uses an asymmetric squared error function for the censored patients, which becomes zero when the model output is larger than the censoring time. This model is referred to as $NN_{ac}$. Unlike $NN_{ci}$ and $NN_{km}$, a higher-risk patient should have a lower score, an estimate proportional to the survival time, in this model.

In addition, the new training model is compared to a support vector machine regressor with an asymmetric penalty function, which incurs a smaller penalty when the model output is larger than the target value (survival time) and a larger penalty when the output is smaller than the target value. This model is referred to as $SVR_c$, and should output a higher score for a lower-risk patient.

A last model compared to the present invention is the Cox proportional hazard model. The Cox model outputs a prognostic hazard score, which is a function of a linear combination of the covariates (input features). The higher the score is, the more risk the model predicts the patient would have.

The empirical results are based on leave-one-out cross-alidation. For all models, model selection was conducted based on cross-validation over the training data for fold 1, and the same model setting was used for all the folds. Generally, a fold is a partition of an original dataset. For example, if the original dataset had only 10 patients and a leave-one-out cross-validation was performed, there would be 10 folds of size 1 where one patient is excluded for testing and the other 9 for training. As another example, 5 folds of size 2 are present in 5-fold cross-validation of 10 patients. All the neural networks based models have 5 hidden units after the model selection. For $NN_{ci}$, γ was chosen to be 0.01. It has been found that the results in terms of the CI value are more sensitive to γ than the AUC metric. n is typically set as 3. The RBF kernel is used in SVRc. To obtain a Cox model, the number of covariates was reduced to 23, since the dataset was too small (i.e., the number of event/recurrences in the dataset was too small to handle the number of variables in question).

The performance is measured in two ways. The first measure is the Concordance Index, which evaluates the model's general predictive accuracy for estimating the probability that a patient with the higher prognostic score will recur within a shorter time than a patient with a lower score. Table 1 (below) shows the Concordance Index values for all the models. Not surprisingly, the new model according to embodiments of the present invention, $NN_{ci}$, achieved the largest CI value over the cross validation results.

| $NN_{ci}$ | $NN_{km}$ | $NN_{ae}$ | $SVR_c$ | Cox |
| --- | --- | --- | --- | --- |
| 0.8178 | 0.5411 | 0.7375 | 0.6206 | 0.7037 |

The survival curves for both the predicted high-risk and low-risk patients are shown in FIGS. 2 to 5 for all the models. Survival curves are constructed for both high-risk and low-risk patients by Kaplan-Meier estimates based on the scores from each model. In each figure, the new model is shown with one of the four other models. A sign of a model successfully distinguishing between the high risk and low risk patient groups is the distance that the high-risk and low-risk survival curves are apart—the farther apart the two curves are, the more successful the model is at distinguishing between the two groups. As is evident in these figures, the high-risk and low-risk survival curves are farthest apart for the $NN_{ci}$ model, indicating a more successful model than the comparison models.

For $NN_{ci}$, $NN_{km}$, and the Cox model, the high-risk group is defined as the patients in the highest quartile of the scores, and the low-risk group consists of the patients in the lowest quartile of the scores. However, for both $NN_{ae}$ and $SVR_c$, the high-risk patients are in the lowest quartile of the scores, and the low-risk patients fall in the highest quartile of the scores. A log-rank test [9] was also conducted for each pair of survival curves of high-risk and low-risk groups within each model, with a "p" value indicating the ability of the model to accurately distinguish high-risk and low-risk patient groups—the lower the p value, the better the ability of the model to distinguish between the two groups.

Table 2 summarizes the p values for all the methods. As shown, the p value for the new model $NN_{ci}$ is much smaller (<0.0001) than all the other models, giving further evidence of the new model's improvement in identifying high-risk and low-risk patient groups.

| $NN_{ci}$ | $NN_{km}$ | $NN_{ae}$ | $SVR_c$ | Cox |
|---|---|---|---|---|
| <0.0001 | 0.15 | 0.01 | 0.10 | 0.01 |

Recalibration

Figure 6:
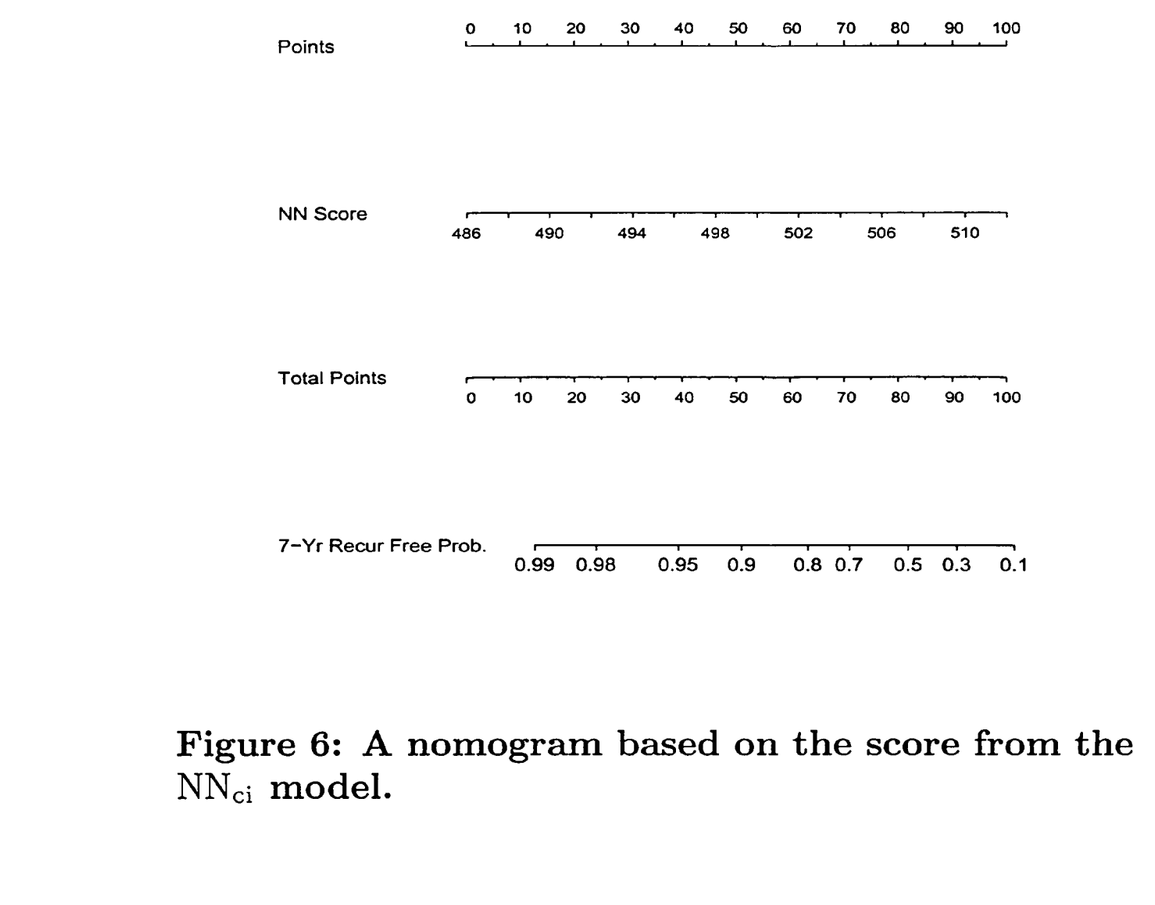
FIG. 6 is a nomogram based on the score from the $NN_{ci}$ model.

In order to make the score from the model have a clinically meaningful interpretation, the scores may be recalibrated to probabilities of remaining free of cancer recurrence in the next 7 years following surgery. The probability is estimated using the cumulative hazard function, also known as the Nelson-Aalen estimator. The Nelson-Aalen estimator incorporates both the baseline hazard rate and the hazard function, estimated via partial likelihood maximization using the Newton-Raphson method [10]. Based on these probability estimates, a nomogram was generated which is shown in FIG. 6. For ease of use, the original scores from the model are multiplied by 1000 in this nomogram.

To use the nomogram, a straight line is drawn up to the points axis from a patients NN score to determine how many points toward recurrence the patient received. This process is repeated for each feature, and the points added together to equal the Total Points. In the example illustrated in FIG. 6, with a single feature, which is the NN score, the Points and Total Points axes are identical. Accordingly, a straight line would be drawn down from the Total Points axis to the corresponding probability of the patient remaining recurrence-free for 7 years following the surgery, assuming the patient does not die of another cause first.

REFERENCES

The following references are all hereby incorporated by reference herein in their entireties.

1. F. E. Harrell. *Regression Modeling Strategies with Applications to Linear Models, Logistic Regression, and Survival Analysis*. Springer, New York, 2001.
2. L. Yan et al., "Optimizing classifier performance via an approximation function to the Wilcoxon-mann-whitney statistic," *Proc. of 20th Int'l Conf. Machine Learning*, pages 848-855, 2003.
3. F. E. Harrell, Regression Modeling Strategies, Springer-Verlag 2001, pp. 247 and 493.
4. H. Gronberg. Prostate cancer epidemiology. *Lancet*, 361: 859-864, 2003.
5. M. W. Kattan, T. M. Wheeler, and P. T. Scardino. Postoperative nomogram for disease recurrence after radical prostatectomy for prostate cancer. *Journal of Clin Oncol*, 17:1499-1507, 1999.
6. M. Graefen, P. I. Karakiewicz, I. Cagiannos, and et al. Validation study of the accuracy of a postoperative nomogram for recurrence after radical prostatectomy for localized prostate cancer. *Journal of Clin Oncol*, 20:951-956, 2002.
7. L. Hood. Systems biology: integrating technology, biology, and computation. *Mech Ageing Dev*, 124:9-16, 2003.
8. E. Davidov, J. Holland, E. Marple, and S. Naylor. Advancing drug discovery through systems biology. *Drug Discov Today*, 8:175-183, 2003.
9. J. D. Kalbfleisch and R. L. Prentice. *The Statistical Analysis of Failure Time Data*. John Wiley & Sons, New York, 1980.
10. J. P. Klein and M. L. Moeschberger. *Survival Analysis: Techniques for Censored and Truncated Data*. Springer, New York, 1997.

What is claimed is:

1. A method for predicting recurrence of cancer in a patient comprising:
    estimating the probability that cancer will recur within a shorter period of time in a patient with a higher prognostic score than a patient with a lower prognostic score, wherein estimating comprises conducting pair-wise comparisons between prognostic scores for patients i and j, using a neural network trained using an objective function comprising a function C substantially in accordance with an approximation of the concordance index.

2. The method according to claim 1, wherein using a neural network trained using an objective function comprises using a neural network trained using an objective function comprising a function C substantially in accordance with a derivative of the concordance index.

3. The method according to claim 1, wherein using a neural network trained using an objective function comprises using a neural network trained using an objective function comprising a function C that allows for the use of censored data in the training.

4. The method according to claim 1, wherein the function C comprises $$C = \frac{\sum_{(i,j) \in \Omega} R(\hat{t}_i, \hat{t}_j)}{|\Omega|},$$

wherein $\Omega$ comprises pairs of patients $\{i, j\}$ meeting one or more predetermined conditions.

5. The method according to claim 1, wherein the function C comprises $$C_\omega = \frac{\sum_{(i,j) \in \Omega} -(\hat{t}_i - \hat{t}_j) \cdot R(\hat{t}_i, \hat{t}_j)}{D}, \text{ wherein}$$

$$D = \sum_{(i,j) \in \Omega} -(\hat{t}_i - \hat{t}_j)$$

is a normalization factor, and $\Omega$ comprises pairs of data (i, j) meeting one or more predetermined conditions.

6. The method according to claim 4, wherein the predetermined conditions comprise at least:
    both patients i and j have experienced recurrence and the recurrence time $t_i$ of patient i is shorter than the recurrence time $t_j$ of patient j; and
    patient i has experienced recurrence and $t_i$ is shorter than patient j's follow-up visit time $t_j$.

7. The method according to claim 5, wherein the predetermined conditions comprise at least:
    both patients i and j have experienced recurrence and the recurrence time $t_i$ of patient i is shorter than the recurrence time $t_j$ of patient j; and patient i has experienced recurrence and $t_i$ is shorter than patient j's follow-up visit time $t_j$.

8. Computer readable media comprising computer instructions for allowing a computer system to perform a method for predicting recurrence of cancer in a patient, the method comprising estimating the probability that cancer will recur within a shorter period of time in a patient with a higher prognostic score than a patient with a lower prognostic score, wherein estimating comprises conducting pairwise comparisons between prognostic scores for patients i and j, using a neural network trained using an objective function comprising a function C substantially in accordance with an approximation of the concordance index.

9. The computer readable media of claim 8, wherein using a neural network comprises using a neural network trained using an objective function comprising a function C substantially in accordance with a derivative of the concordance index.

10. The computer readable media of claim 8, wherein using a neural network comprises using a neural network trained using an objective function comprising a function C that allows for the use of censored data in the training.

11. The computer readable media according to claim 8, wherein the function C comprises $$C = \frac{\sum_{(i,j) \in \Omega} R(\hat{t}_i, \hat{t}_j)}{|\Omega|},$$

wherein $\Omega$ comprises pairs of patients $\{i, j\}$ meeting one or more predetermined conditions.

12. The computer readable media according to claim 8, wherein the function C comprises $$C_\omega = \frac{\sum_{(i,j) \in \Omega} -(\hat{t}_i - \hat{t}_j) \cdot R(\hat{t}_i, \hat{t}_j)}{D}, \text{ wherein}$$

$$D = \sum_{(i,j) \in \Omega} -(\hat{t}_i - \hat{t}_j)$$

is a normalization factor, and $\Omega$ comprises pairs of data (i, j) meeting one or more predetermined conditions.

13. The computer readable media according to claim 11, wherein the predetermined conditions comprise at least:
both patients i and j have experienced recurrence and the recurrence time $t_i$ of patient i is shorter than the recurrence time $t_j$ of patient j; and
patient i has experienced recurrence and $t_i$ is shorter than patient j's follow-up visit time $t_j$.

14. The computer readable media according to claim 12, wherein the predetermined conditions comprise at least:
both patients i and j have experienced recurrence and the recurrence time $t_i$ of patient i is shorter than the recurrence time $t_j$ of patient j; and
patient i has experienced recurrence and $t_i$ is shorter than patient j's follow-up visit time $t_j$.

* * * * *